United States Patent Office 3,419,698
Patented Dec. 31, 1968

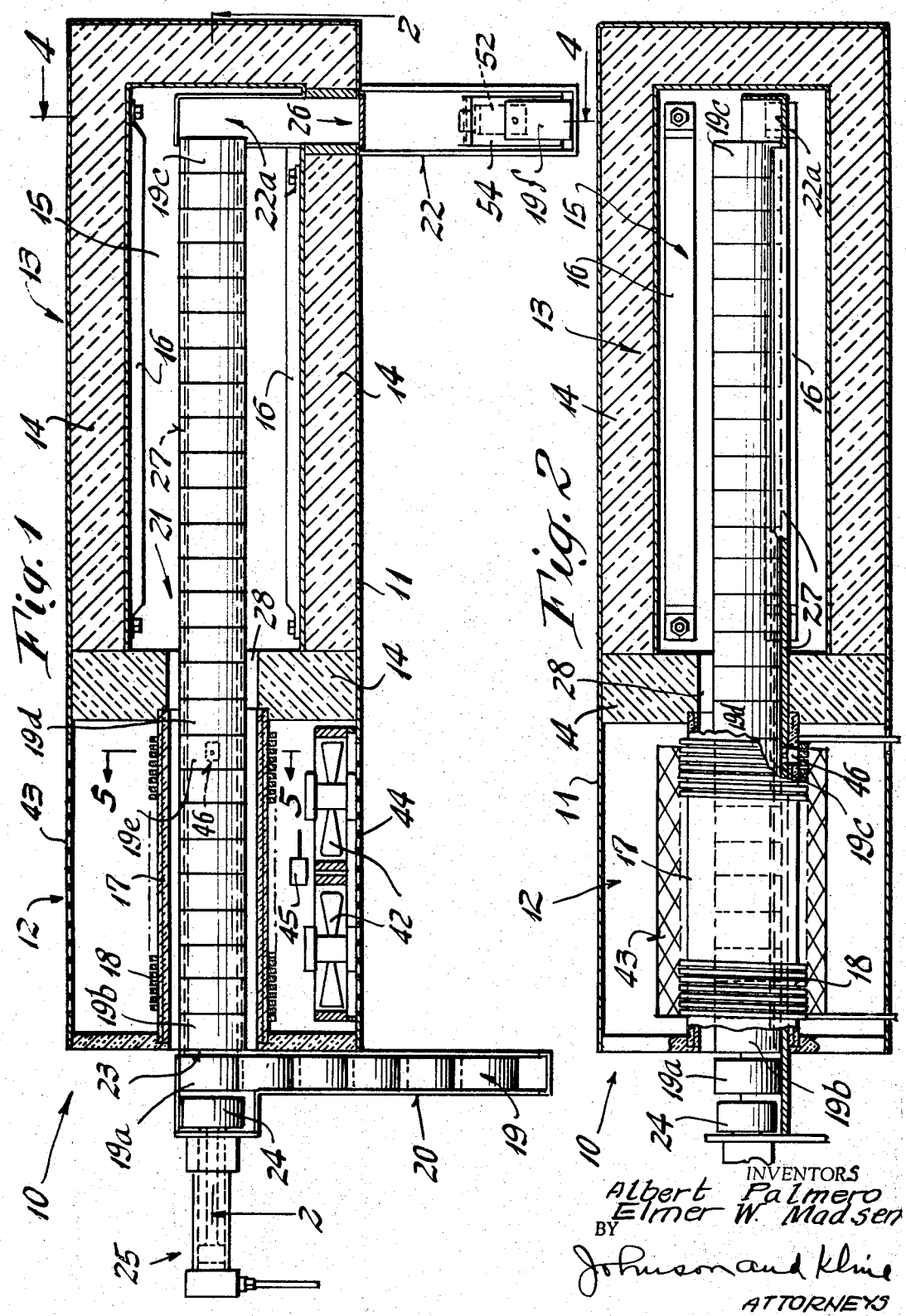

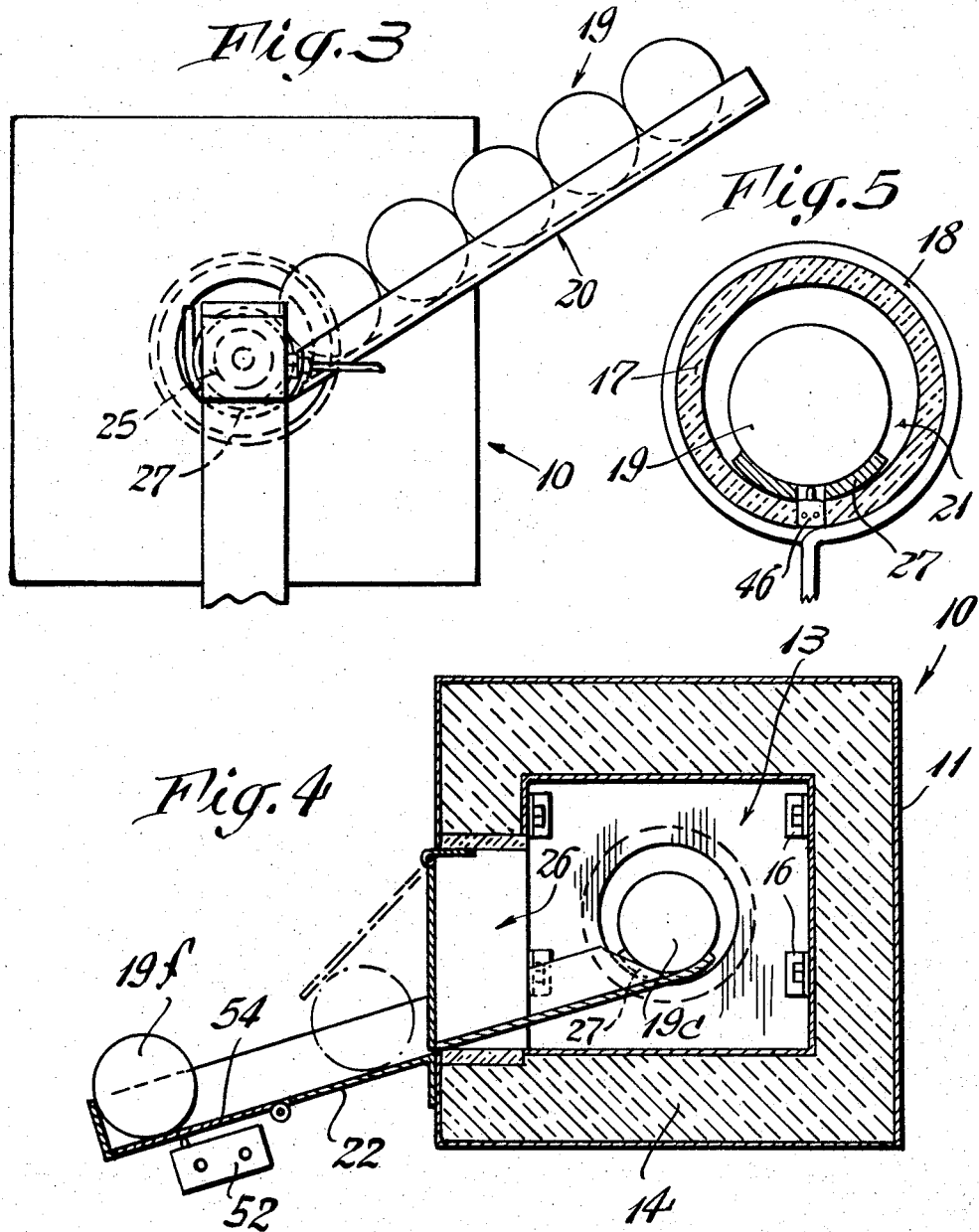

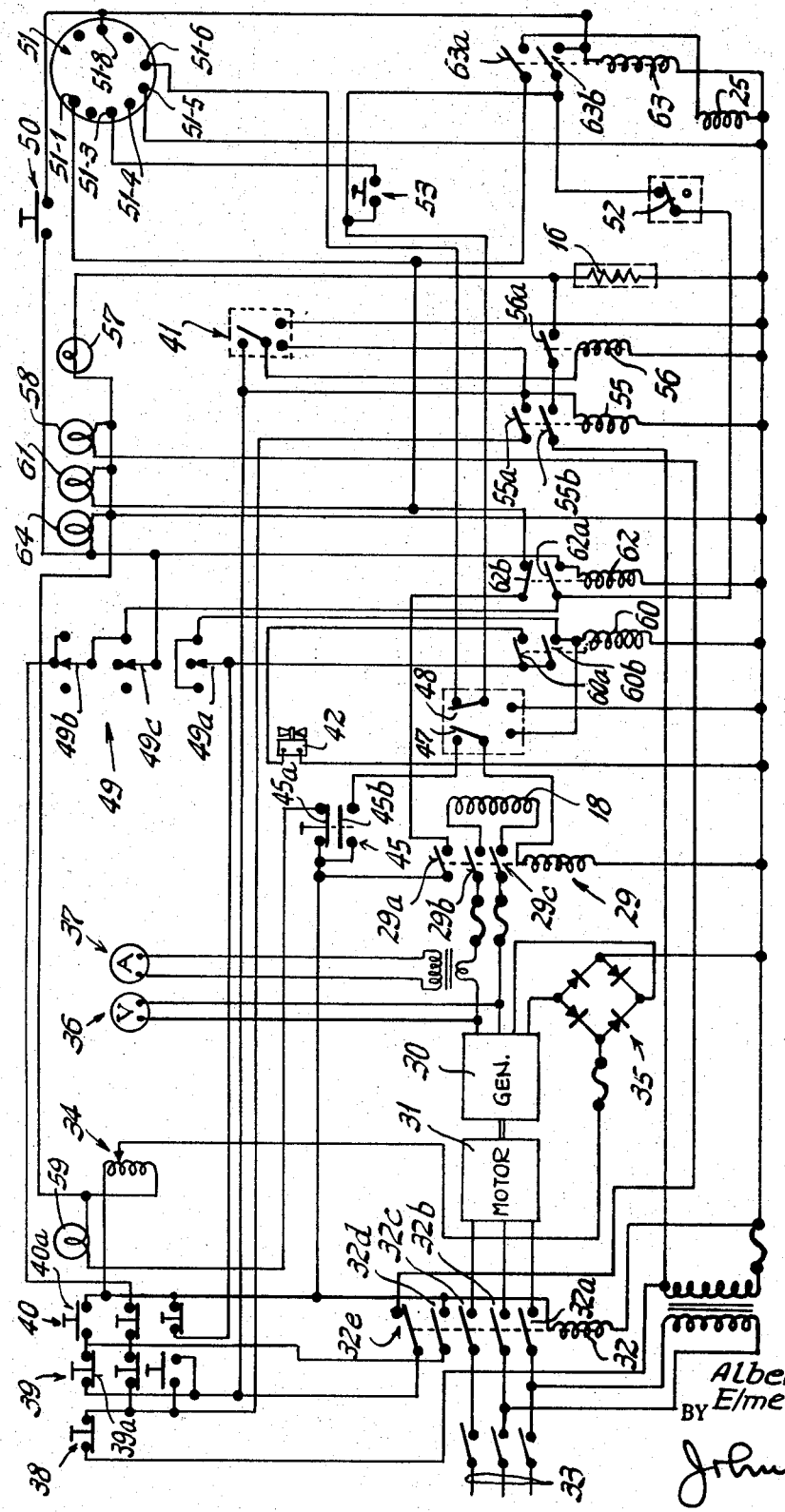

3,419,698
WORKPIECE HEATING OVEN
Albert Palmero, Wallingford, and Elmer W. Madsen, Bristol, Conn., assignors to The Superior Electric Company, Bristol, Conn., a corporation of Connecticut
Filed Sept. 21, 1965, Ser. No. 488,897
10 Claims. (Cl. 219—10.47)

ABSTRACT OF THE DISCLOSURE

An oven for heating a plurality of workpieces which includes an elongate passageway having an induction heating entrance portion and an ambient fluid heating exit portion with each portion capable of heating a plurality of workpieces and in which the injection of a cold workpiece in the passageway displaces out of the passageway an evenly heated workpiece.

In many manufacturing processes, it has been found necessary in order to perform a subsequent process on a workpiece, to have the workpiece heated to a relatively high temperature. One process requiring a heated workpiece is where a plastic coating is formed on the workpiece by spraying or otherwise depositing the plastic as a powder thereon. The workpiece is required to be heated to a temperature which causes the plastic powder particles to melt and then fuse together to form a unitary coating. In such a process, the workpiece is required to be quite precisely at a preselected temperature otherwise the coating may differ in thickness from the desired value and/or be unevenly formed. While it has heretofore been proposed to heat the workpieces in a heated oven, such has not been found desirable for many reasons including their relatively large size, long warm-up period, cost, etc. Alternatively, heating the workpiece by the use of an induction coil also has not been found too satisfactory because the workpiece is heated unevenly and consequently will not have the same temperature throughout.

It is accordingly an object of the present invention to provide an oven for heating workpieces which combines the quickness and efficiency of heating of an induction coil but yet provides for uniformity of temperature throughout the workpiece with the temperature being selectable and accurately controlled.

Another object of the present invention is to provide an oven which may be made substantially automatic in providing heated workpieces and in which whenever a cold workpiece is inserted in the oven, a heated workpiece is ejected.

A further object of the present invention is to provide an oven for heating workpieces which is exceedingly compact, easily installed and relatively economical to manufacture and which may provide heated workpieces at a predetermined rate.

In the oven of the present invention, there is provided an elongate passageway having an entrance and an exit. Cold workpieces are forced into the entrance and advanced along the passageway by the introduction of successive workpieces. When the passageway is filled with workpieces by the workpieces abutting each other, the introduction of each succeeding workpiece effects the ejection of a heated workpiece that is evenly heated throughout to a selected temperature.

The initial part of the passageway or entrance portion is formed as an induction heater and thus includes an induction coil which is energized by high power A.C. of a selectable frequency. The entrance portion is sufficiently long to accommodate a plurality of workpieces and except as hereinafter pointed out, the induction coil is maintained continuously energized and thus raises the temperature of the workpieces relatively rapidly. But the temperature of the workpieces is not even throughout as heat generated is mostly generated on the exterior periphery of the workpiece.

In accordance with the present invention to provide a heated workpiece that has a constant temperature throughout, the passageway has a chamber or exit portion that communicates with the entrance portion with each workpiece moving from the latter to the former. In the exit portion, which is elongate, to also contain a substantial number of workpieces, the ambient temperature is maintained at substantially the temperature to which it is desired to heat the workpieces. Thus in the exit portion, the unevenness of heating of the workpiece produced by the induction coil is dissipated and the workpiece is caused to assume throughout, the temperature of the exit portion.

The normal operation of the oven of the present invention is to provide heated workpieces at a substantially constant rate. In order to assure that the workpiece will be at the desired temperature, its temperature is sensed prior to its movement from the induction heating portion of the passageway and if its temperature deviates from a desired range, changes may be either manually or automatically effected to overcome the deviation. Thus if the workpiece is too hot, the induction coil energy is reduced or terminated while if the workpiece is not hot enough, the workpiece is retained longer in the induction heating portion where it receives additional induction heating. This is effected by the preventing of a cold workpiece from being introduced into the entrance and moving the not hot enough workpiece away from the influence of the induction heating coil.

Other features and advantages will hereinafter appear.

In the drawing:

FIG. 1 is a sectional plan view of the workpiece heating oven of the present invention.

FIG. 2 is a vertical section taken on the line 2—2 of FIG. 1.

FIG. 3 is a left-hand end view of the oven.

FIG. 4 is a section taken on the line 4—4 of FIG. 1.

FIG. 5 is a detail section taken on the line 5—5 of FIG. 1, somewhat enlarged.

FIG. 6 is an electrical schematic diagram.

Referring to the drawing, the oven of the present invention is generally indicated by the reference numeral 10 and includes an enclosure 11 that may be mounted on any suitable support. The oven is basically divided into two heating portions, an induction heating portion 12 and an ambient temperature heating portion 13. The latter portion has insulation 14 secured on the interior of the enclosure to define a chamber 15. The air in the chamber is heated to a selectable temperature by any convenient heating means and in the embodiment shown, the heating means specifically consists of electric resistance heating elements 16 which are alternately energized and deenergized to maintain the temperature within the chamber at a substantially constant selectable value.

The induction coil heating portion 12 includes a tubular member 17 of insulating material about which is spirally wound a length of conducting wire to form an induction heating coil 18.

The oven is utilized preferably to heat workpiece 19 to a desired temperature with all surfaces of the workpiece having substantially the same temperature and to this end, cold workpieces 19 are stacked in an inclined chute 20 and caused to move along a passageway 21 consisting of the interior of the tube 17 and the chamber 15 where they are heated to exit into an exit trough 22 where each heated workpiece may be removed by an operator for subsequent operations. The chute 20 guides the workpieces 19 to an entrance 23 of the tube 17 wherein a cold workpiece 19a is shown positioned. Aligned with the workpiece is a plunger 24 operated by a linear actuating member 25 which may be a solenoid of fluid piston and which upon actuation moves rightwardly to force the piece 19a to assume the position which a piece 19b had previously occupied.

With the movement of the workpiece 19a to the former position of workpiece 19b, all workpieces 19 within the tube 17 and chamber 15 are simultaneously forced one workpiece width to the right which causes piece 19c to be forced onto the interior portion 22a of the trough 22. The trough 22 is slightly inclined, and as the workpieces are substantially circular in the embodiment of the invention shown, a heated workpiece 19c will roll to the end of the trough 22 by exiting through an opening 26 in the enclosure 11. Subsequent energization of the linear actuating member 25 will force individual workpieces to traverse the above-noted path and for each cold piece introduced, a heated workpiece is ejected. A track 27 which is formed of metal extends along the passageway 21 from the entrance through the induction heating portion 12 and the ambient temperature heating portion 13 with the track serving to support the workpieces as they are slid therealong. The induction heating portion 12 is in communication with the ambient temperature heating portion 13 through an opening 28 formed in the insulation 14 with the track extending therethrough.

It will be appreciated that in the operation of the oven, the induction coil 18, when energized, continually inductively heats a workpiece as it traverses the tube 17 until the workpiece reaches a position occupied by a workpiece indicated by the reference character 19d. The workpiece 19d subsequently becomes influenced by the ambient temperature heating portion 13. The induction heating portion has a length which is sufficiently long to contain a plurality of workpieces, such as nine in the specific embodiment shown, and to apply heat to all nine simultaneously. Thus even though the workpieces may have a shape in which induction heating would inherently cause wide variations in temperature in each workpiece, the temperature variations are minimized by each workpiece being subject to induction heating for a relatively long length of time, thereby enabling conduction of heat within the workpiece.

The portion 13 is also of a length to accommodate a plurality of workpieces which enables each workpiece to be in the heating portion 13 a time sufficient for the unevenness of temperature of the workpiece 19 to be eleminated and have each workpiece achieve the temperature of the chamber 15 whose temperature is accurately controlled.

It will accordingly be appreciated that although the oven 10 is capable of supplying heated workpieces at a relatively rapid rate, for example every 6–8 seconds for a stator core of a fractional horsepower motor, each workpiece receives induction heating and ambient temperature heating for a much longer period. This is achieved by simultaneously inductively heating a plurality of workpieces 19 and an ambient temperature heating of a plurality of workpieces to thus provide workpieces which are evenly heated to substantially the temperature of the chamber 15. The workpieces 19 as shown abut each other to completely fill the passageway 21.

The oven of the present invention is substantially automatic in operation in controlling the ejection of workpieces which have the desired temperature and as will be hereinafter apparent may be completely automatic in delivering heated workpieces at a set rate or upon a manual command. Referring to FIG. 6, the electrical schematic diagram of the electrical circuit of the oven, the induction coil 18 is energized through a magnetic relay 29 having contacts 29a, 29b and 29c with alternating current of a relatively high frequency. This power in the specific embodiment shown is derived from a generator 30 driven by a motor 31, the latter being connected through contacts 32a, 32b and 32c of a magnetic relay 32 to a three phase source of power, generally indicated by the reference numeral 33. While a motor generator set is shown for supplying the inductive heating power, it will be appreciated that other different power converting sources, such as solid state circuits may be employed.

For enabling an operator to adjust the power transmitter from the generator to the coil 18 in order to control the amount of induction heat received by the workpiece, there is provided an adjustable voltage transformer 34 connected through a rectifying bridge 35 to the field of the generator 30. A voltmeter 36 and an ammeter 37 are interconnected with the output of the generator to provide an indication of the power to the coil. Other components in the electrical circuit of the oven include a stop switch 38, a three-gang warm-up switch 39 and a three-gang power switch 40 all of which may be conveniently mounted for operation by an operator and are of the momentary operable type. The heating elements 16 of the oven 10 are schematically shown as resistances and as will be hereinafter appreciated, their energization is controlled by a thermostatic switch 41.

The oven of the present invention in order to enable the induction coil to be easily installed and/or altered in size to heat different shaped workpieces utilizes air-cooled induction coils. Thus referring to FIG. 1, there is provided a pair of fans 42 which circulate air over the induction coil 18 by means of grillwork 43 and 44 formed in the enclosure. For reasons which will be hereinafter apparent there is also mounted in the induction heating part an air flow switch 45 for sensing the movement of air over the coil 18.

In order to assure that the temperature of each workpiece ejected will have the desired temperature, the present invention provides for sensing the temperature of a workpiece just prior to its movement from the induction coil portion 12 into the ambient temperature portion 13 and utilizing the temperature sensed to control either the injection of further cold pieces or energization of the coil 18. Accordingly, there is mounted in the track 27 for engagement with the bottom of a workpiece 19e, a thermocouple 46 or other temperature sensing device. The heat sensing member 46 controls through appropriate commercially available pyrometer circuitry, a pair of switches, namely a normally open switch 47 and a normally closed switch 48.

The oven 10 is capable of being either manually operated to cause injection of a piece or automatically operated to effect injection upon preselected conditions occurring. For selecting manual or automatic operation there is provided a three-position switch 49 which when set for manual control, requires a switch 50 to be operated for injecting a cold workpiece. When the switch 49 is set in the automatic position, injection of the workpiece by the plunger 24 will only occur if three conditions occur, namely (a) a determined length of time has elapsed since the ejection of the previous workpiece, (b) a heated workpiece has been moved from the trough 22 and (c) an injection button has been operated either automatically or by the operator. In the circuit there is thus interconnected a timing switch 51, a normally closed switch 52 and a manually operable switch 53. The switch 52 as shown in FIG. 4 is mounted on the trough 22 with the trough being formed with a hinged plate 54 that is engageable by a workpiece 19f in the trough with the workpiece forcing the plate 54 downwardly to cause operation of switch 52 from its normally closed position.

With the above structure, the operator assuming the oven has not been utilized for many hours, such as occurs during overnight shutdown, initially presses the warm-up switch 39 which energizes a relay coil 55 causing closure of switches 55a and 55b. The switch 55a forms a holding circuit for the coil of the relay 55 to maintain it energized. In addition, if the oven does not have the desired ambient temperature, switch 41 senses the low temperature and closes to energize relay 56 enabling current to pass through switch 56a to energize resistance heating elements 16. For indicating the condition of the oven to an operator, an oven light 57 becomes illuminated whenever the resistance heating elements 16 are energized. Also as the present operation is only to provide for initially bringing the ambient temperature portion to the desired temperature, a stand-by light 58 is energized to indicate that the oven is in a stand-by condition. If also the light 57 is energized, then the oven is not in condition to deliver workpieces heated to the desired temperature.

Upon the oven achieving its desired temperature, switch 41 will open deenergizing the resistance element 16 and the light 57 and indicating to the operator that the oven is in condition for providing heated workpieces. Accordingly, the operator then momentarily actuates switch 40 which energizes a relay 32 effecting closure of switches 32a–32d and opening of switch 32e. Switch 32d serves as a holding circuit for maintaining the magnetic relay 32 actuated while switches 32a, 32b and 32c pass power to the motor 31. Switch 32e upon opening ceases illumination of the stand-by light 58. It will be appreciated that the energization of magnetic relay 32 cannot be achieved unless the relay coil 55 is energized as current flows thereto through the switch 55a, switch 39a and switch 40a to effect its initial energization. Additionally, if desired to merely deenergize the induction coil, energization actuation of the switch 39 will open the circuit through the holding switch 32d and effect deenergization of the magnetic relay 32. With the motor 31 being energized, the light 59 becomes illuminated indicating that power is ready to be supplied to the induction coil. The operator may then, if neded, adjust the adjustable voltage transformer 34 to provide the desired voltage reading on the meter 36.

With the oven in the above condition, the operator is required to actuate switch 49 momentarily to either the automatic or manual position, the switch 49 being of the spring return to center position type. Either actuation of the switch 49a will effect energization of the coil of a relay 60 closing switches 60a and 60b. Switch 60b constitutes a holding circuit for the relay 60 while switch 60a effects energization of the fans 42. Upon the fans becoming operative to provide air flow through the grillwork 43 and 44 of the enclosure, air movement over the induction coil is sensed by the air-flow switch 45 changing its position so that switch 45a becomes open while switch 45b becomes closed. Switch 45b energizes through the now closed switch 47, the relay 29 to close the switches 29b and 29c and effect energization to the induction coil 18.

It will thus be appreciated that the relay 29 which controls the energization to the induction coil 18 is controlled by the air-flow switch 45 and also by the normally opened workpiece temperature sensing switch 47. Thus if the air-flow switch should return to its normal position indicating that sufficient air movement over the induction coil has ceased or stopped, the induction coil will become deenergized. Alternatively as the switch 47 is of the type which is normally closed when the temperature of the workpiece is below a maximum value as sensed by the thermocouple 46 then whenever the workpiece exceeds the maximum temperature, the switch 47 will open effecting deenergization of the induction coil 18. The induction coil with both switches 45 and 47 closed is maintained energized at all times with the power thereto being adjusted so that each workpiece will have the desired temperature when it is at the position of workpiece 19e. Also upon the operation of the relay 29, an automatic light 61 is energized through switch 29a and a normally closed switch 62b of a relay 62 having another switch arm 62a, the relay 62 when the oven is in automatic operation being unenergized. The chamber 15 is maintained at a desired operating temperature by the thermostat 41 controlling operation of the relay 56 that controls the energization of the heating element 16.

With a workpiece positioned in the trough 22, the normally closed switch 52 is in its open position and upon removal of the workpiece, the plunger 24 is then capable of being subsequently actuated by the solenoid 25 to inject another workpiece into the entrance and force ejection of a workpiece into the trough 22. When the switch 52 returns to its normally closed position, after removal of the workpiece, current flows through the switch 49b, switch 52, normally closed switch 48 (said switch being closed as it is assumed the workpiece 19e has a desired temperature) and into the timing switch 51. The timing switch has a plurality of utilized contacts, namely 51–1, 51–3, 51–4, 51–5, 51–6 and 51–8. The contact 51–5 is connected to one side of a single phase source derived from the three phase source of power 33 and when a momentary pulse occurs on the contact 51–3 through operation of the switch 53, the timing switch 51 begins operation. After a selectable period of time, the timing switch interconnects the contacts 51–6 and 51–8 which energizes relay 63 to effect closing of switches 63a and 63b. Switch 63b constitutes the holding circuit for the relay 63 to maintain it energized while solenoid 25 is energized through switch 63a. Upon the solenoid being energized to move the plunger 24 sufficiently to inject a cold workpiece into the induction heating portion 12, a heated workpiece is ejected into the trough 22, actuating switch 52. This action deenergizes the relay coil 63 which then deenergizes solenoid 25 and enables the latter to return to its normal position as by a spring though of course if desired a double acting solenoid may be employed or a solenoid valve controlled air piston.

It will be thus appreciated that irrespective of the rapidity with which a user removes heated workpieces from the trough 22 that a definite time will elapse between ejection of workpieces by reason of the delay caused by the timing switch 51. It will also be understood that the switch 48 is in series with the contacts 51–6 and 51–8 that control energization of the relay 63. If the switch 48 is open as by the temperature of the workpiece being sensed by the thermocouple 46 being less than the desired temperature, relay 63 will not be energized and a cold workpiece will not be injected. The switch 48 is closed however when the temperature of the workpiece sensed is greater than a minimum selected value.

The switch 53 has been described as being manually operated but if desired it may be operated by a timeswitch which would cause ejection of heated workpieces at a constant rate. Alternatively the switch 53 may be operated by other machinery such as a machine which operates on the heated workpiece and thus the cycle of the oven may be controlled by the subsequent machine to produce heated workpieces as they are needed.

The oven, instead of automatic control may be manually operated by momentary closure of the switch 50 thus bypassing, among other structure, the timing switch 51.

For manual operation the operator is required to move the switch 49 momentarily to have the right-hand contacts engaged which effects energization of the relay 62 through the switch 49c. A holding circuit is established through the switch 62a. Also the switch 62b will become open, deenergizing the automatic light 61 and energizing the manual light 64 indicating to the operator that the oven is in condition for manual operation. Closure of the switch 50 energizes the relay 63 which is maintained energized by the relay holding circuit through the switches 63b and 52 and solenoid 25 is energized until a heated workpiece is ejected to open switch 52. It will also be appreciated that in the manual operation the timing switch 51 receives its energy through the switch 62b and as this switch is opened when relay 62 is energized the timing switch is effectively removed from the circuit. Also the switch 48 is effectively removed from the circuit and thus has no control over the operation of the injection of the workpieces when the manual operating condition is set.

The thermally responsive switches 41 and high limit switch 47 and low limit switch 48 may be of any desired type. One particular embodiment that may be employed and which also provides an indication of the temperature sensed is a switch currently available from API Instruments Company and called a controlling pyrometer. A timing switch 51 which may be employed is that commercially available from the Cramer Company and is of the type which begins the timing cycle upon energization between the contacts 51–3 and 51–5 and at the end of the timing cycle closes contacts 51–6 and 51–8. Moreover, upon it being subsequently energized at the contact 51–3 it resets itself to repeat the timing cycle while the contact 51–1 provides for energization of the motor.

It will accordingly be appreciated that there has been disclosed an oven for heating workpieces which combines the quickness of induction heating together with the even heating and accurate temperature produced by ambient temperature heating. This is achieved by forming a passageway in the oven and having an entrance portion into which cold workpieces are introduced and an exit portion from which heated workpieces are ejected. Both portions of the passageways are elongate and capable of accommodating in abutting relation a number of workpieces. In the entrance portion the workpieces are subjected continuously to induction heat and after they have reached a predetermined temperature they are forced into the exit portion. This portion provides ambient temperature heat to the workpieces and is sufficiently long to enable the unevenness of the induction heating of the workpieces to be dissipated and for the workpieces throughout to substantially attain the ambient temperature of the exit portion.

Variations and modifications may be made within the scope of the claims and portions of the improvements may be used without others.

We claim:

1. An oven for simultaneously heating a plurality of workpieces with each workpiece being individually introduced and individually ejected comprising means forming an elongate passageway having an entrance and an exist, said workpieces being adapted to be individually introduced into the entrance to be moved along the passageway and ejected from the exit, induction coil heating means associated with the entrance portion of said passageway for inductively heating workpieces contained within said portion, said heating means including a nonconducting tube and length of solid conducting wire wound around the exterior of the tube and means for air-cooling said coil, heating means associated with an exit portion of said passageway for maintaining a selected ambient temperature in said exit portion, said entrance portion being of a length to accommodate a plurality of workpieces and said exit portion being of a length to accommodate a plurality of workpieces and in which the air-cooling means includes at least one fan, means for sensing the movement of air over the coil, and means interconnecting said air movement sensing means and the induction coil heating means for preventing energization of the induction coil heating means upon the sensing means sensing the absence of a desired quantity of air movement.

2. The invention as defined in claim 1 in which there is a first manually operable control for controlling the energization of the induction coil heating means, a second manually operable control for controlling energization of the ambient fluid heating means and interconnecting means for disabling operation of the first control means until the second manual control has been actuated.

3. An oven for simultaneously heating a plurality of workpieces with each workpiece being individually introduced and individually ejected comprising means forming an elongate passageway having an entrance and an exist, means for positioning workpieces individually at the entrance and means for forcing each such positioned workpiece into said passageway, the workpieces in the passageway abutting each other and said forcing means advancing toward the exit all workpieces within the passageway, induction coil heating means associated with the entrance portion of said passageway for inductively heating workpieces contained within said portion, ambient fluid heating means associated with an exit portion of said passageway for maintaining a selected ambient temperature of fluid in said exit portion, said fluid filling said exit portion to heat the workpieces therein, said entrance portion being of a length to accommodate a plurality of workpieces and said exit portion being of a length to accommodate a plurality of workpieces.

4. The invention as defined in claim 3 in which a workpiece holding station is positioned at the exit exterior of the passageway and means for preventing introduction of a workpiece into said entrance whenever a workpiece is located at the workpiece holding station.

5. The invention as defined in claim 3 in which there is workpiece temperature sensing means for sensing the temperature of a workpiece, said means being positioned adjacent the other end of the entrance portion remote from the entrance and means interconnecting the sensing means to alter the operation of the oven upon sensing a deviation of the temperature of a workpiece from a desired temperature.

6. The invention as defined in claim 5 in which the last-named means is interconnected with the induction heating means and reduces the induction heating upon the temperature sensed exceeding the desired temperature.

7. The invention as defined in claim 5 in which the last-named means is interconnected with the forcing means and operative to prevent introduction of a workpiece into the entrance upon the temperature sensed being lower than the desired temperature.

8. An oven for simultaneously heating a plurality of workpieces with each workpiece being individually introduced and individually ejected comprising means forming an elongate passageway having an entrance and an exit, means for positioning workpieces individually at the entrance means for forcing each said positioned workpiece into said passageway, time delay means for preventing the forcing means from forcing a successive workpiece into the passageway until after a selected time delay, induction coil heating means associated with the entrance portion of said passageway for inductively heating workpieces contained within said portion, ambient fluid heating means associated with an exit portion of said passageway for maintaining a selected ambient temperature of fluid in said exit portion, said fluid filling said exit portion to heat the workpieces therein, said entrance portion being of a length to accommodate a plurality of workpieces and said exit portion being of a length to accommodate a plurality of workpieces.

9. The invention as defined in claim 8 in which the induction coil heating means is normally maintained energized and means for adjusting the power to the induction coil heating means.

10. The invention as defined in claim 8 in which there are means interconnected with the time delay means for preventing operation of the time delay means, and including a manually operable member whereby upon actuation a workpiece is forced into said passageway.

References Cited

UNITED STATES PATENTS

| | | | |
|---|---|---|---|
| 1,691,349 | 11/1928 | Harrington, et al. | 219—10.71 X |
| 2,465,306 | 3/1949 | Durand | 219—10.71 X |
| 2,578,760 | 12/1951 | Strickland | 219—10.71 X |
| 2,669,647 | 2/1954 | Segsworth | 219—10.71 |
| 2,876,325 | 3/1959 | Baffrey | 219—10.69 |
| 2,905,797 | 9/1959 | Guyer et al. | 219—10.71 |
| 3,056,876 | 10/1962 | Schmidt | 219—10.71 |

RICHARD M. WOOD, *Primary Examiner.*

L. H. BENDER, *Assistant Examiner.*

U.S. Cl. X.R.

219—10.69, 10.71